Nov. 23, 1965    J. R. MOSS ETAL    3,219,394
PNEUMATIC GRAIN CONVEYOR
Filed March 30, 1962    2 Sheets-Sheet 1
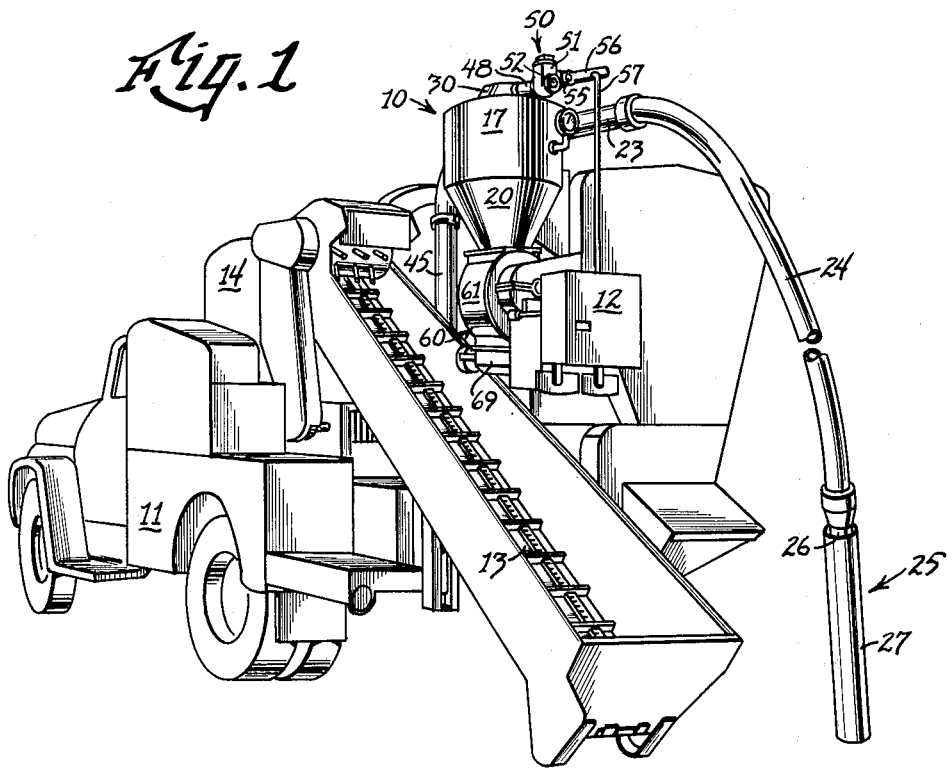
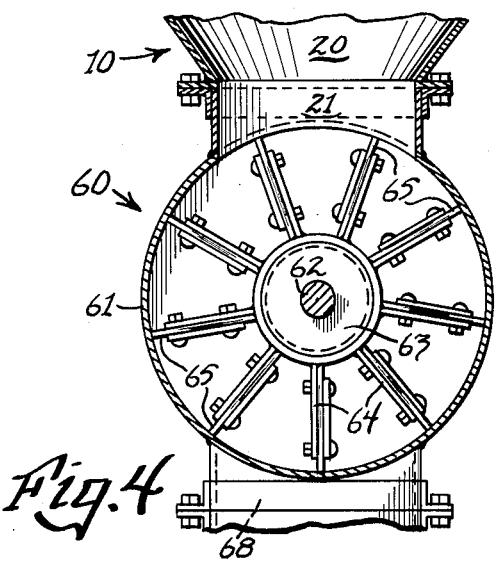
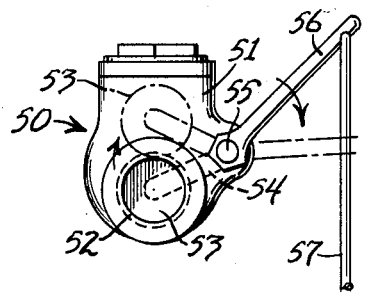
INVENTORS:
JAMES R. MOSS &
EDWARD T. KOCH, JR.
BY
Harrington A. Lackey
ATTORNEY Nov. 23, 1965     J. R. MOSS ETAL     3,219,394
PNEUMATIC GRAIN CONVEYOR
Filed March 30, 1962     2 Sheets-Sheet 2
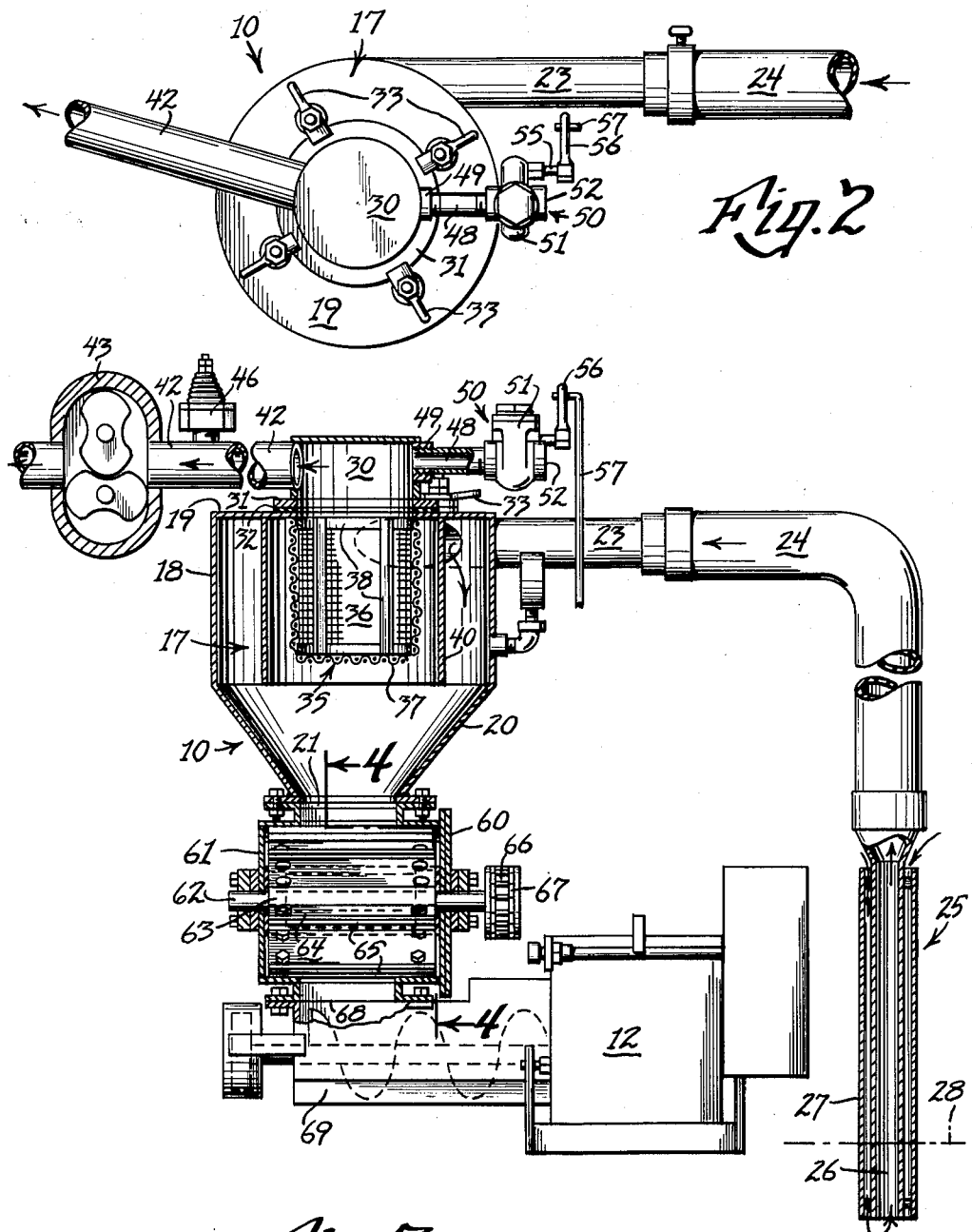
INVENTORS:
JAMES R. MOSS &
EDWARD T. KOCH, JR.
BY
Harrington A. Lackey
ATTORNEY

3,219,394
PNEUMATIC GRAIN CONVEYOR

James R. Moss, Springfield, and Edward T. Koch, Jr., Goodlettsville, Tenn., assignors to Seco, Inc., Goodlettsville, Tenn., a corporation of Tennessee
Filed Mar. 30, 1962, Ser. No. 183,865
4 Claims. (Cl. 302—59)

This invention relates to a pneumatic grain conveyor and more particularly to a novel vacuum device for elevating, separating, and loading grain.

One object of this invention is to provide a novel vacuum grain loading device for a mobile feed mill.

Another object of this invention is to provide a more efficient grain elevating, separating and loading device.

A further object of this invention is to provide a vacuum grain loading device which may be easily and quickly stopped and started.

Another object of this invention is to provide a vacuum cyclone-type grain loading device incorporating a screen separator, and provided with novel means for simultaneously stopping the loading operation and cleaning the screen.

A further object of this invention is to provide a novel means for quickly by-passing the air flow from a pneumatic grain conveyor in order to immediately stop the conveyance of grain.

Further objects and advantages of the invention will be apparent from the following description taken in conjunction with the drawings, wherein:

FIG. 1 is a perspective view of the invention mounted on a mobile feed mill;

FIG. 2 is a top plan view of the invention;

FIG. 3 is a side elevation of the invention, with parts shown in section;

FIG. 4 is a section taken along the line 4—4 of FIG. 3; and

FIG. 5 is an end elevation disclosing operative positions of the exhaust valve.

Referring now to the drawings in more detail, FIG. 1 discloses the pneumatic grain conveyor or elevator 10 mounted on a mobile feed mill, including a truck chassis 11. The conveyor 10 is adapted to elevate and discharge grain into an automatic weighing device 12, which in turn deposits the weighed grain upon a continuously moving mill table or endless conveyor belt 13, which transfers the grain to the hammer mill 14 for grinding. The grain is pulverized in the hammer mill 14, and then mixed with other ingredients, such as molasses, vitamin supplements, etc., and then discharged into bags, bins or other receptacles as edible feed.

More specifically, the conveyor 10 comprises a grain receiving chamber or shell 17, preferably a cyclone having an upper cylindrical wall 18, a top wall 19, and a lower frusto-conical side wall 20 terminating in a circular grain outlet 21. An intake pipe 23 communicates with the interior of the chamber 17 by a tangential connection with the upper side wall 18. The free end of the intake pipe 23 is connected to an elongated flexible hose 24, preferably made of metal, the opposite end of which is connected to a nozzle 25. The nozzle 25 comprise a reduced inner tubular member 26 communicating with the hose 24, and an outer cylindrical member 27 concentric with the tubular member 26 and substantially the same length. The purpose of this nozzle structure is to provide a more effective suction when the nozzle 25 is inserted into a pile of grain 28.

On top of the top cyclone wall 19 is an inverted drum-shaped valve chamber 30, having an open bottom for communicating through a like opening in the top wall 19 with the cyclone 17. The periphery of the bottom of the chamber 30 is provided with a ring flange 31 adapted to seat upon an annular rubber seal or gasket 32 of the same shape in order to prevent air leakage between the valve chamber 30 and the cyclone 17. The ring flange 31 is maintained in sealed position by the pivoted clamps 33.

Depending from the bottom of the wall 19 is a screen member 35 having a cylindrical screen wall 36 and a closed screen bottom wall 37, shaped and supported by the framework 38. The screen member 35 is concentric within the cyclone 17 and coaxially aligned with the valve chamber 30. The top of the screen member 35 is open to communicate with the open bottom of the valve chamber 30. Also concentrically mounted around the screen member 35 is a cylindrical tub guard 40 having an open bottom spaced below the bottom screen wall 37 and substantially level with the joint between the upper chamber wall 18 and the lower chamber wall 20. The top of the tub guard 40 is mounted flush against the bottom of the top wall 19.

Extending radially from and in communication with the side wall of the valve chamber 30 is an outlet air conduit, such as the pipe 42. The other end of the outlet conduit 42 communicates with a gas or air pump or blower 43, which is operated to create a suction in the direction of the arrow in the outlet conduit 42. The suction developed by the blower 43 is strong enough to extend through the valve chamber 30, the screen member 35, the cyclone 17, the inlet conduits 23 and 24, and to draw grain from the pile 28 through the nozzle 25. The outlet conduit 42 is broken in FIG. 3 to illustrate that the conduit 42 may be of any desired length, and may include a flexible hose section 45, as illustrated in FIG. 1. A conventional vacuum relief valve 46 is illustrated in FIG. 3 to exhaust the pipe 42 when the vacuum exceeds a predetermined value, for example, when the nozzle 29 or hose 24 becomes clogged.

Substantially opposite the outlet pipe 42, a pipe nipple 48 is supported in an opening in the side wall of the valve chamber 30 by means of a coupling 49. The opposite end of the nipple 48 is coupled to an exhaust valve 50 of a conventional manufacture. FIG. 5 discloses the exhaust valve 50 as comprising a housing 51 having a valve port 52 communicating through the housing 51 with the nipple 48. The exhaust port 52 is normally closed by a valve disc 53 supported on an arm 54 which is pivotally supported on a rotary shaft 55 operated by a handle 56, to which may be attached a pull cord 57, if desired. When the pull cord 57 is pulled down, the handle 56 is pulled down to its dashed-line position (FIG. 5), pivoting the arm 54 and the valve disc 53 upward to their dashed-line positions, thereby opening the exhaust port 52. When the pull cord 57 is released, the valve disc 53 and the arm 54 are sufficiently heavy to drop by gravity to close the port 52. However, if this gravitational method of closing the exhaust valve is not satisfactory, then of course spring means may be employed to bias the valve closed.

In order to discharge grain from the cyclone 17 without reducing the vacuum effect, a rotary grain feeder 60 is mounted below the cyclone 17 in communication with the grain outlet 21. The feeder 60 comprises a cylindrical housing 61 in which is coaxially mounted a rotary shaft 62 supporting a hub 63 and uniformly spaced radial vanes 64. Upon the outer end of each vane 64 is mounted a rubber tip 65 adapted to sweep in close engagement with the inner wall of the housing 61. Thus, by driving the rotary shaft 62 through means, such as a sprocket 66 and chain 67, each adjacent pair of vanes 64 communicating with the outlet 21 will receive and convey a predetermined quantity of grain through the housing 61 to be discharged through the opening 68 into any convenient receptacle, such as the screw conveyor 69, which transfers the grain to the weighing device 12. As each vane 64 rotates beyond the grain outlet 21, its corresponding tip 65 engages the cylindrical wall of the housing 61 to create a pressure-tight air lock to maintain the vacuum within the cyclone 17.

The operation of the conveyor is as follows:

The mobile feed mill is moved by rolling the truck chassis 11 to a convenient position where the nozzle 25 may be inserted below the surface of the pile of grain 28, desired to be conveyed to the mill for converting to feed. The exhaust valve 50 remains closed. The suction blower 43 is started to create a vacuum and move air through the conveyor system 10. The rotary shaft 62 is driven through the chain 67 and sprocket 66 in order to rotate the vane feeder 60. The screw conveyor 69 and the mill table 13 are started. With the nozzle 25 inserted into the grain pile 28, as illustrated in FIG. 3, a suction is created behind the blower 43 through the outlet 42, the valve chamber 30, the screen member 35, the cyclone 17, the inlet pipes 23 and 24 and the nozzle 25. This suction causes air to flow downward between the tubular members 27 and 26 in the nozzle 25, around the end of the tubular member 26 and upward into the interior of the member 26. This movement of air sucks grain from the pile 28, and a mixture of grain and air will be carried through the nozzle 25, the flexible hose 24 and the inlet pipe 23 into the cyclone 17 between the upper wall 18 and the tub guard 40. Because the fluid mixture of grain will enter the cyclone 17 at a tangent, the mixture will pass in a rapid spiral path around the cyclone between the walls 18 and 40. The spiral path will also be downward by virtue of gravity so that the heaviest grain particles will spiral downward around the frusto-conical lower wall 20 through the outlet 21 and between the corresponding vanes 64. The air will pass through the screen walls 36 and 37 into the valve chamber 30 through the outlet pipe 42 and the pump 43 into the atmosphere. The chaff and lighter grain particles which do not separate easily from the air will be separated on the outer surfaces of the screen walls 36 and 37. The grains which drop through the outlet 21 will be discharged by the vane feeder 60 into the conveyor 69. The grain is then weighed by the device 12 and deposited on the mill table 13 for transfer to the hammer mill 14.

If it is desired to temporarily stop the conveyance of grain from the pile 28 into the cyclone 17 without stopping the suction pump 43, either the cord 57 or the handle 56 may be pulled downward to open the exhaust valve 50 which immediately diverts the suction path from the inlet pipe 23 and the cyclone 17 to the nipple 48 and the exhaust valve 50. Air from the atmosphere immediately rushes through the exhaust port 52, the nipple 48, the valve chamber 30 and directly into the outlet pipe 42, so that the air movement by-passes the cyclone 17 to immediately stop the flow of grain into the cyclone 17.

Opening of the exhaust valve 50 is a very quick method of stopping the conveyance of grain. Heretofore, in conventional pneumatic grain conveyors, there has been a waiting period of several seconds or minutes after stopping the suction blower before the flow of grain ceases. The provision of the exhaust valve 50 therefore eliminates any time lag between stopping the air flow and terminating the flow of grain.

In addition to its value as a means of rapidly stopping the grain flow, the opening of the exhaust valve 50 also produces a self-cleaning operation for the screen member 35. When the valve 50 is opened, part of the air rushing into the valve chamber 30 descends into and through the screen member 35, and not only releases, but forces off most of the chaff and grain particles adhering to the outer surfaces of the screen walls 36 and 37. It will thus be seen that a very efficient and economical apparatus has been provided for not only elevating, separating and loading grain by a vacuum means, but also for quickly stopping the grain flow and for automatically self-cleaning the separating screen.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. In a pneumatic grain conveyor having a grain receiving chamber, an inlet, an outlet and a screen member in said grain chamber between said inlet and said outlet, pneumatic control means comprising:
    (a) a valve chamber communicating with said screen member,
    (b) an outlet conduit continuously communicating with said valve chamber,
    (c) suction means for drawing air through said outlet conduit from said valve chamber,
    (d) an exhaust valve communicating with said valve chamber on the same side of said screen member as said outlet conduit,
    (e) operative means normally closing said exhaust valve to permit the free passage of air from said grain receiving chamber through said screen member, said valve chamber and said outlet conduit, and
    (f) means for actuating said operative means to open said exhaust valve to permit air to pass through said exhaust valve into said valve chamber, a portion of said air following one path through said outlet conduit and another portion of said air following another path through said screen member into said receiving chamber.

2. In a pneumatic grain conveyor having a cyclone chamber, an inlet, an outlet in the top of said cyclone chamber, and a screen member in said cyclone chamber to separate grain from the air passing from said cyclone chamber through said outlet, pneumatic control means comprising:
    (a) a valve chamber communicating with said outlet,
    (b) an outlet conduit continuously communicating with said valve chamber on one side of said outlet,
    (c) suction means for drawing air through said outlet conduit from said valve chamber,
    (d) an exhaust valve communicating with said valve chamber on the opposite side of said outlet,
    (e) operative means normally closing said exhaust valve to permit the free passage of air from said grain receiving chamber through said screen member, said valve chamber and said outlet conduit, and
    (f) means for actuating said operative means to open said exhaust valve to permit air to pass through said exhaust valve into said valve chamber, a portion of said air following one path across said valve chamber through said outlet conduit, and another portion of said air following another path through said outlet and said screen member into said cyclone chamber.

3. The invention according to claim 2 in which said valve chamber has an open bottom communicating with said outlet and an upstanding side wall around said outlet, said outlet conduit and said exhaust valve being mounted in said side walls substantially opposing each other.

4. The invention according to claim 3 in which said side wall is cylindrical, and said outlet conduit and said exhaust valve are mounted radially in said cylindrical side wall, and substantially opposite each other.

References Cited by the Examiner
UNITED STATES PATENTS

| | | | |
|---|---|---|---|
| 585,804 | 7/1897 | Weber | 302—23 |
| 1,385,870 | 7/1921 | Gieseler | 302—58 |
| 2,276,805 | 3/1942 | Tolman | 302—59 |

SAMUEL F. COLEMAN, *Primary Examiner.*

ANDRES H. NIELSEN, ERNEST A. FALLER,
*Examiners.*